United States Patent
Clark et al.

(10) Patent No.: US 6,310,418 B1
(45) Date of Patent: Oct. 30, 2001

(54) REDUCTION OF SPARKING IN LARGE ROTATING ELECTRICAL MACHINES

(75) Inventors: Paul Eaton Clark, Rugby; Roger Henry Regan, Northants, both of (GB)

(73) Assignee: Alstom UK Limited (GB)

( * ) Notice: Subject to any disclaimer, the term of this patent is extended or adjusted under 35 U.S.C. 154(b) by 0 days.

(21) Appl. No.: 09/369,763

(22) Filed: Aug. 6, 1999

Related U.S. Application Data

(63) Continuation-in-part of application No. 08/507,450, filed as application No. PCT/GB94/00517 on Mar. 16, 1994.

(30) Foreign Application Priority Data

Apr. 1, 1993 (GB) .................................................. 9306824

(51) Int. Cl.$^7$ .................................................. H02K 1/22
(52) U.S. Cl. ........................ 310/261; 310/220; 310/221; 310/45
(58) Field of Search .............................. 310/261, 45, 220, 310/196, 221; 427/7, 58, 126.2, 376.4; 428/389, 688

(56) References Cited

U.S. PATENT DOCUMENTS

| | | | |
|---|---|---|---|
| 3,659,129 | * | 4/1972 | Pettersen ............................. 310/216 |
| 4,054,500 | | 10/1977 | Parent . |
| 4,429,007 | * | 1/1984 | Bich et al. ........................... 428/389 |
| 4,694,268 | | 9/1987 | Kawamura et al. . |
| 4,988,538 | * | 1/1991 | Horvei et al. ....................... 427/53.1 |
| 5,208,190 | | 5/1993 | Anderson et al. . |
| 5,436,083 | * | 7/1995 | Haluska et al. ...................... 428/688 |
| 5,711,987 | * | 1/1998 | Bearinger et al. ....................... 427/7 |
| 5,935,638 | * | 8/1999 | Chandra et al. ....................... 427/58 |

FOREIGN PATENT DOCUMENTS

| | | |
|---|---|---|
| 38232094A1 | 3/1990 | (DE) . |
| 4106700A1 | 5/1992 | (DE) . |
| 4-39073 | 2/1992 | (JP) . |
| 6-56928 | 5/1994 | (JP) . |

OTHER PUBLICATIONS

Abstract of the contents of p. 86 to 132 of *Die Isolierstoffe der Elektrotechnik* (the Insulating materials used in Electrical Engineering), pp. 1–6 and full text.

* cited by examiner

Primary Examiner—Nestor Ramirez
Assistant Examiner—Thanh Lam
(74) Attorney, Agent, or Firm—Kirschstein, et al.

(57) ABSTRACT

In a large rotating electrical machine having a rotor comprising conductor bars of copper located in slots in a rotor core and connected together at their ends to form a winding, the conductor bars are electrically insulated from the rotor core by a coating on the conductors of a ceramic-based material. The coating serves to prevent sparking occurring between the conductor bars and the rotor core.

13 Claims, 2 Drawing Sheets

REDUCTION OF SPARKING IN LARGE ROTATING ELECTRICAL MACHINES

CROSS-REFERENCE TO RELATED APPLICATIONS

This application is a continuation-in-part of pending U.S. patent application Ser. No. 08/507,450, filed Mar. 1, 1996, which is a 371 of PCT/GB94/00517, filed on Mar. 16, 1994.

BACKGROUND OF THE INVENTION

1. Field of the Invention

This invention relates to rotating electrical machines.

More particularly the invention relates to rotating electrical machines rated at powers in excess of 10 kilowatts, of the kind having a rotor comprising conductor bars of copper or similar conducting material located in slots in a rotor core of magnetic material and connected together to form a winding. These will be referred to below as electrical machines of the kind specified. Examples of such machines are induction motors wherein the rotor conductor bars are connected at their ends to form a cage winding and synchronous motors wherein the rotor conductors are connected to form a damper cage winding.

2. Description of the Related Art

During manufacture of the rotor, it is customary to insert the copper or aluminum conductor bars by force-fitting them into the slots, thereby slightly distorting the bars and/or the slots. This procedure is intended to ensure a very tight fit of the bars into the slots, thereby obviating any relative movement between them and so enabling the bars to remain fixed securely in the slots throughout the service life of the machine.

In such machines the rotor conductor bars are usually uninsulated. However, in recent years it has become apparent that in some circumstances sparking can occur between the uninsulated conductor bars and the rotor core. Surprisingly, such sparking can occur even when uninsulated bars have previously been tightly located in their slots in the rotor core. Such sparking is unacceptable in machines required to operate in explosive atmospheres.

It has been discovered that such sparking can be prevented by ensuring that the conductor bars are continually in perfect electrical contact with the rotor core. However, while such contact can perhaps be achieved in a new machine, it is impossible to guarantee that such contact is maintained throughout the service life of the machine, due for example to in-service cyclic stresses and to the different thermal expansions of the materials of the conductor bars and the rotor core.

An alternative solution to the problem of sparking is to insulate the conductor bars electrically from the rotor core. However, the selection of a satisfactory method of insulation has proved difficult. For example, wrapping the conductors in insulating tape or sheet has proved unsatisfactory because it is not possible to wrap the tape or sheet sufficiently tightly to achieve adequate tightness of the wrapped conductors in the rotor core slots to avoid fatigue failure of the bars.

Two other methods of insulation that have been proposed are disclosed in, for example, Japanese Patent No. 63-253 842 and U.S. Pat. No. 3,213,302.

Japanese Patent No. 63-253842 is concerned with the provision of insulation between a field coil and an iron core and between the turns of the field coil and proposes the use for the insulating material between the turns, of an inorganic insulating material, resin and a curing agent applied to a glass cloth. U.S. Pat. No. 3,213,302 on the other hand, discloses the use of sodium phosphate insulation with steel laminations and conductor bars as used in magnetic cores of electric power equipment.

The possibility of applying a silicon dioxide coating to copper rods in a squirrel cage motor is mentioned in U.K. Pat. No. 824 861 but such a coating is not designed to prevent sparking and would not be utilizable in the large machines with which the present invention is concerned.

SUMMARY OF THE INVENTION

It is an object of the present invention to provide a rotating electric machine of the kind specified, wherein the problem of sparking is alleviated so as to ensure long term safe operation of the machines in potentially explosive atmospheres.

According to the present invention there is provided a rotating electrical machine rated at a power in excess of 10 kilowatts having a rotor comprising: a rotor core of magnetic material and having slots therein. Conductor bars are located in the slots in the rotor core and electrically connected together to form a winding. A coating on the conductor bars of a heat treated ceramic-based material has a firing temperature. The coating is applied to the conductor bars and the ceramic-based material undergoes a heat treatment before the conductor bars are located in the slots. The heat treatment is at or above the firing temperature of the ceramic-based material, and the coating is adapted to prevent sparking between the conductor bars and the rotor core.

The coating suitably consists of a ceramic-based material, preferably a micro-porous alumina ceramic-based material, such a coating being suitably applied to the conductor bars using a plasma spraying process. Alternatively, the coating may be a glass ceramic, such as a lithia/zinc oxide/silicate ($LiO_2/ZnO/SiO_2$) glass ceramic.

The coating's thickness should be less than 500 micrometers, but greater than about 15 micrometers, preferably 20 to 250 micrometers, with glass ceramic coatings being at the bottom end of the latter range.

When the coating is of micro-porous material, it is suitably impregnated with a synthetic resin material before insertion of the conductor bars into the slots.

In a further aspect, the invention provides a rotor for a rotating electrical machine, the rotor comprising conductor bars and a magnetic iron rotor core having slots therein for the reception of the conductor bars. The conductor bars are force-fitted into the slots and consist of softer metal than the iron rotor core. To prevent sparking from occurring between the conductor bars and the rotor core, and to inhibit loosening of the conductor bars in the slots during the service life of the machine due to unwanted abrasion of the conductor bars during and after the force-fitting process, the conductor bars are electrically insulated from the rotor core by a coating on the conductor bars of a ceramic-based material. The coating is applied prior to force-fitting of the conductor bars into the slots, whereby said unwanted abrasion is transferred from the relatively soft conductor bars to the harder iron core and thereby reduced.

In yet another aspect, the invention provides a rotor for a rotating electrical machine, comprising: a rotor core of magnetic material, the rotor core having slots therein. Conductor bars are located in the slots in the rotor core and are electrically connected together to form a winding. A plasma-sprayed ceramic-based powder coating is provided on the conductor bars. The coating has a microporous structure comprising the sprayed powder with voids therebetween.

The coating is applied to the conductor bars before the conductor bars are located in the slots and the coating is adapted to prevent sparking between the conductor bars and the rotor core. The coating is impregnated with a synthetic resin material such that the voids are filled with the synthetic resin material, whereby the insulation, resilience and heat transfer characteristics of the coating are improved.

BRIEF DESCRIPTION OF THE DRAWINGS

Rotating electrical machines of the kind specified and in accordance with the invention, will now be described, by way of example, with reference to the accompanying drawings, in which.

DETAILED DESCRIPTION OF THE PREFERRED EMBODIMENTS

Figure 1:
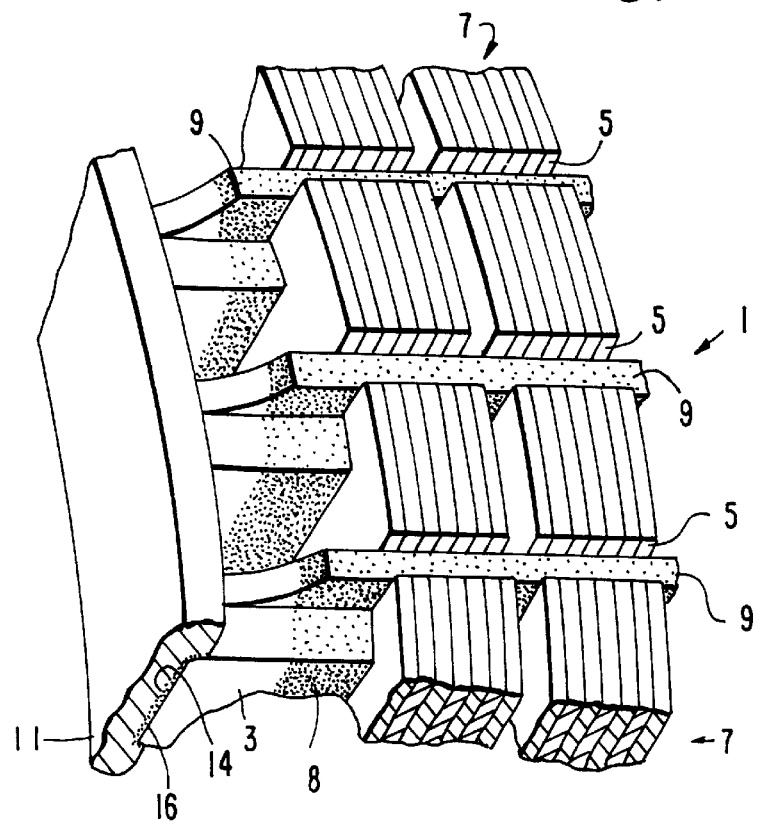
FIG. 1 is a diagrammatic sectioned perspective view of part of a rotor for such machines, with conductor bars in the rotor core having an insulating coating applied thereto.

Referring to FIG. 1, the first machine to be described is an induction motor rated at 1500 kilowatts and having a cage rotor 1 comprising fifty copper rotor conductor bars 3 disposed in slots 5 around the periphery of the rotor core 7, each conductor 3 having an L-shaped cross-section of overall dimensions 10.04 by 45.74 millimeters and a web portion 9, i.e., a vertical limb portion, of dimensions 3.5 by 10 millimeters.

The rotor core 7 is of sectional form and fabricated in conventional manner from laminations of magnetic material of thickness of 0.5 millimeter.

Figure 3:
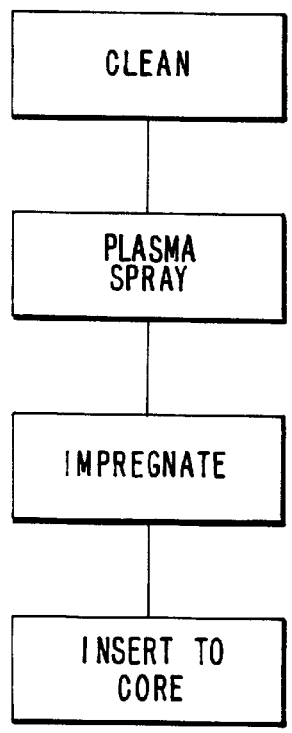
FIGS. 3 and 4 are process flow charts showing two different processes for applying insulating coatings to the conductor bars.

As shown by the flow chart of FIG. 3, prior to insertion in the rotor slots 5 the rotor conductor bars 3 are cleaned and provided with an electrically insulating coating 8 by plasma spraying them using an alumina ceramic powder in an inert gas in a plasma spray gun. To obtain optimum bonding of the coating to the bars, it may be necessary to roughen the surface of the bars after cleaning. Plasma spraying processes are in themselves well known, see for example, an article entitled "Plasma-sprayed Coatings" appearing on pages 78 to 83 of the September 1988 issue of Scientific American, and the use of such a process is also disclosed in SA-2472/72 which involves the coating of a bearing.

A plasma spray gun typically comprises a water-cooled cone-shaped cathode inside a water-cooled cylindrical anode, which extends beyond the cathode to form a nozzle. A stream of the inert gas, typically argon mixed with hydrogen, is passed through the space between anode and cathode where it ionizes and forms a plasma.

The powder material is directed via a tube into the plasma jet that forms in the nozzle.

The direct current supply connected between the anode sustains an arc, which in turn produces a plasma flame that jets out of the nozzle. The flame entrains and melts the powder particles and propels them onto the target where they rapidly solidify to form a coating. Note that the firing temperature of alumina is 1700 degrees Centigrade and the effect of the plasma flame is to heat the particles well above this temperature before they impact the conductor bars.

After being formed by the plasma spraying process the coatings are impregnated with a synthetic resin material using any convenient known process, for example, a vacuum impregnation process.

Resin impregnation of the plasma sprayed coating was instituted when it was discovered during testing that the moisture content of the micro-porous coating, which could vary due to environmental factors, significantly affected its insulating ability. This variability was overcome by the resin impregnation. The combination of the micro-porous ceramic coating and the synthetic resin achieved the following benefits:

elimination of environmental influence on insulation ability of the coating;

improved resilience of the coating; and improved heat transfer from the copper bar 8 to the iron rotor core.

Figure 2:
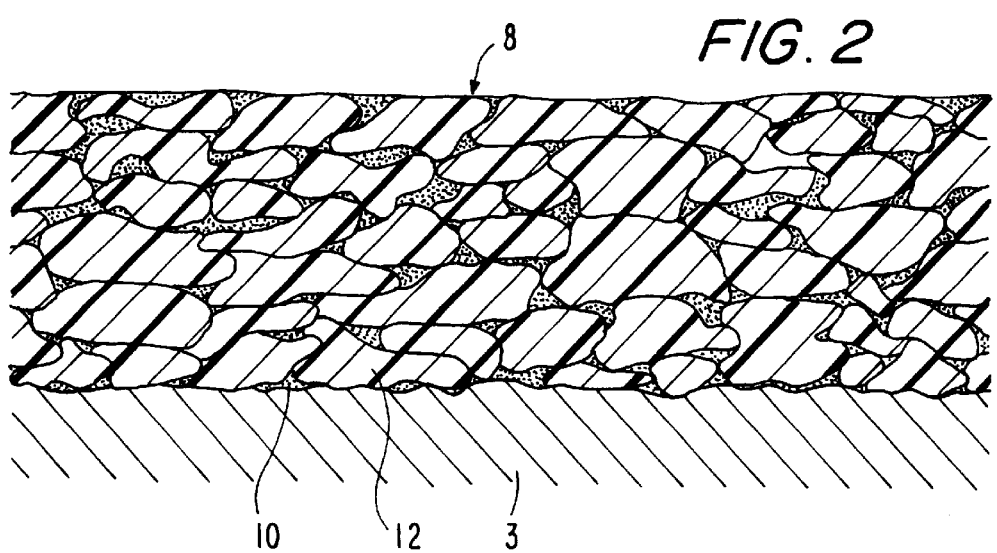
FIG. 2 is a sketch (not to scale) showing a section through an example of an insulating coating suitable for the conductor bars of FIG. 1.

A finished resin-impregnated plasma-sprayed coating 8 is sketched in FIG. 2. For convenience of illustration, the size of the alumina particles 10 is exaggerated relative to the thickness of the coating. Plasma-sprayed coating thicknesses of up to a maximum of 500 micrometers are contemplated by the inventors, though thinner coatings (say, 100 to 250 micrometers) are preferred to ensure better flexibility of the bars and better heat conduction across the coating from the bars 3 into the rotor core 7. If the coating thickness is too great, thermal transfer from the bars to the rotor core and the air will be unduly impeded and the flexibility of the bar and the coating's ability to withstand cyclic stresses will be impaired.

From FIG. 2, it can be seen that when they were sprayed onto the substrate copper conductor bar 3, alumina particles 10 are partially wrapped around and interlocked with each other to produce a firmly adherent coating. Nevertheless, the coating in the as-sprayed condition is porous, having interconnected voids between adjacent particles 10. These voids have been filled by vacuum impregnation with the synthetic resin material 12, so producing a more advantageous coating.

After coating, the conductor bars 3 are inserted in the rotor core slots 5 and connected together to form a cage winding. Such connection of bars 3 is achieved by means of end rings 11 of copper or copper alloy which are usually provided with slots or recesses 14 to receive the ends of the conductor bars 3, the bars being then brazed or welded to the end rings at joint lines 16.

Figure 4:
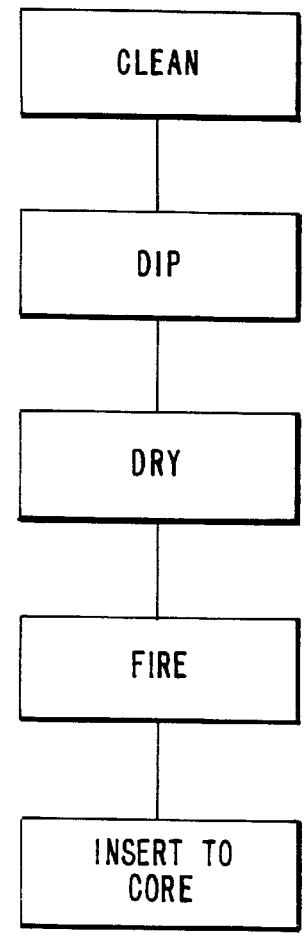

The second machine embodiment will now be described, in which, instead of forming the coatings using a plasma spraying process and impregnating, the coatings are formed as shown in the flow chart of FIG. 4 by first dipping the conductor bars 3 into a liquid suspension of a suitable ceramic-based material, for example a suspension of a glass ceramic precursor powder in water. The dipped bars are then dried so that free water or other solvent is eliminated from the coating, whereupon the bars are fired to produce a glass ceramic coating. Since after firing the coating material is mostly or entirely in the glassy state, it is not significantly micro-porous and does not require impregnation with resin to prevent moisture ingress. Coatings produced in this way may have thicknesses in the range 15 to 100 micrometers, preferably 20 to 50 micrometers.

Figure 5:
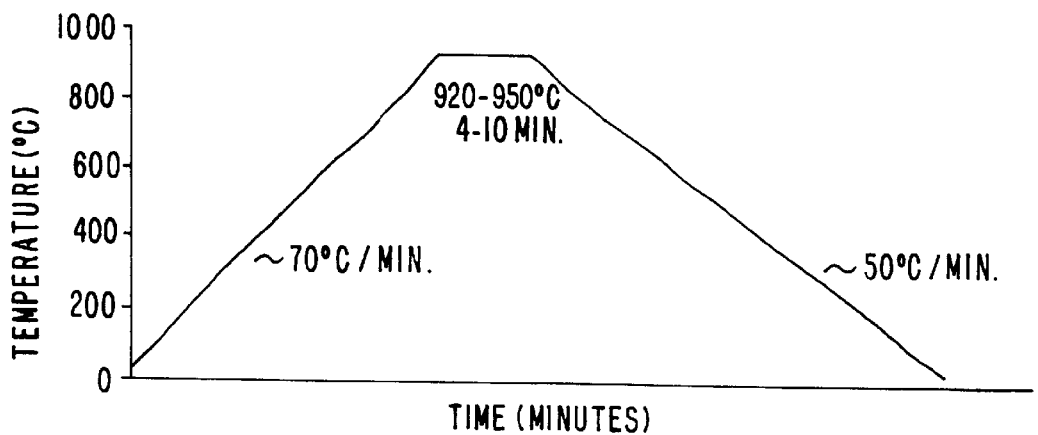
FIG. 5 is a graph of time versus firing temperature for converting a glass precursor coating material to a glass-ceramic coating.

FIG. 5 shows a graphical representation of a typical time versus firing temperature regime for converting a lithia/zinc oxide/silicate ($Li_2O$—$ZnO$—$SiO_2$) glass precursor to its glass-ceramic form. The actual values of both the times and the temperatures used in a particular case will be dependent on the exact geometry of the substrate and the coating thickness as well as the substrate material type. However, it will be noted from FIG. 5 that the maximum firing temperature is well below the melting point of pure copper (1083 degrees Centigrade), so that this firing process can readily be used to practice the invention.

The heating and cooling process represented by the graph can be achieved using well known types of heat zoned ovens in which the coated conductor bars are continuously conveyed through the zones. In the present case, the temperature of the bars is increased from room temperature to between 920 and 950 degrees Centigrade at a rate of about 70 degrees Centigrade per minute. It is maintained at peak temperature for between four and ten minutes, then cooled back down to room temperature at a rate of about 50 degrees Centigrade per minute.

To be suitable for the intended purpose, an insulating coating for the conductor bars must be simultaneously (a) very hard, (b) deformable and (c) very adherent to the bars so that there is no danger of it flaking off or otherwise coming loose when the bars (i) are force-fitted into the slots, (ii) are subject to high temperatures and distortions caused by the welding or brazing process which is used to link the bars through end rings to form a winding, and (iii) suffer in-service cyclic stresses and rapid differential expansions between the bars and the rotor core.

The use of ceramic-based materials to form the insulating coatings on the conductor bars 3 provides very robust coatings which adhere strongly to the conductors and provide the degree of electrical insulation required, while at the same time giving the required level of heat transfer from the conductor bars 3 to the rotor core 7. Furthermore, the coatings are sufficiently robust to withstand not only cyclic stresses, but also the high temperatures and significant deformation of the ends of the conductor bars 3 which occur during brazing or welding to the end rings 11, without breaking down or flaking off.

Investigative work conducted in connection with this invention showed that when an uncoated bar (e.g., of copper or aluminum) was force-fitted into the slots, small surface portions would be removed from the bar by the harder iron core. The significance of this removal of material from the bars in helping to negate the anti-sparking benefits of apparently tightly fitted bars, even in new machines, had not been appreciated or discussed in the prior art. Under the continuing influence of vibration, cyclic stresses and differential expansion and contraction during service, the removal of surface material from the bars during manufacture facilitated a continuing process of loosening of the bars and the further productions of sparks between bars and core.

In the present invention, the use of a fired ceramic-based material results in a coating which is extremely hard and rugged, and which is harder than the iron rotor core. Thus, when a conductor bar which has a coating of a fired ceramic is forced into the slots of the rotor core, material at the edges and surfaces of the iron is abraded by contact with the hard ceramic, but in total the abrasion experienced by the hard iron is less than that experienced by the uncoated soft copper or aluminum bars. In other words, the application of the ceramic coating to the bars prior to their force-fitting into the slots results in the abrasion experienced during and after the force-fitting process being transferred from the relatively soft conductor bars to the harder iron core. This results in a tighter fit than can be achieved by uncoated bars, or those having various other types of coatings.

Additionally, it has been found that when plasma-sprayed coatings according to the invention are utilized, they have a high degree of flexibility. The combination of these factors is found to result in an exceptionally good fit of the conductor bars in the slots.

It was also found that such plasma-sprayed coatings do not cause annealing (i.e., softening) of the conductor bars, and therefore do not deleteriously affect their strength.

It will be appreciated that ceramic materials other than alumina and glass ceramics may be used for the conductor bar insulating coatings of machines in accordance with the invention. In general materials which have hitherto been used for purposes such as providing heat resistant and/or wear resistant coatings on components such as internal combustion engine parts, e.g., oxides based on zirconium, as described in the above mentioned article in "Scientific American", may be expected to be satisfactory.

What is claimed is:

1. A rotor for a rotating electrical machine, comprising:
   a rotor core of magnetic material, the rotor core having slots therein;
   conductor bars located in the slots in the rotor core and electrically connected together to form a winding; and
   a plasma-sprayed ceramic-based powder coating on the conductor bars for preventing sparking between the conductor bars and the rotor core, said coating having a microporous structure comprising particles with voids therebetween, the coating covering the conductor bars before the conductor bars are located in the slots, the coating being impregnated with a synthetic resin material such that the voids are filled with the synthetic resin material.

2. The machine according to claim 1, wherein the conductor bars are electrically connected to common end rings to constitute said winding.

3. The machine according to claim 1, wherein the coating consists of an alumina ceramic-based material.

4. The machine according to claim 1, wherein the coating has a thickness of between 15 and 500 micrometers.

5. The machine according to claim 4, wherein the coating has a thickness of between 20 and 250 micrometers.

6. The machine according to claim 1, wherein the coating comprises a micro-porous ceramic-based material.

7. The machine according to claim 6, wherein the coating is a plasma-sprayed coating.

8. The machine according to claim 6, wherein the coating is impregnated with a synthetic resin material.

9. The machine according to claim 1, wherein the coating consists of a glass ceramic material.

10. A rotating electrical machine rated at a power in excess of 10 kilowatts having a rotor, comprising:
    a rotor core of magnetic material and having slots therein;
    conductor bars located in the slots in the rotor core and electrically connected together to form a winding;
    a coating on the conductor bars for preventing sparking between the conductor bars and the rotor core, the coating being a ceramic-based material having a firing temperature and a heat treatment before the conductor bars are located in the slots at or above the firing temperature of the ceramic-based material; and
    the coating consisting of a lithia/zinc oxide/silicate glass ceramic material.

11. The machine according to claim 10, wherein the conductor bars are electrically connected to common end rings to constitute said winding.

12. The machine according to claim 10, wherein the coating has a thickness in the range 15 to 100 micrometers.

13. The machine according to claim 12, wherein the coating has a thickness in the range 20 to 50 micrometers.

* * * * *